United States Patent Office 3,087,877
Patented Apr. 30, 1963

3,087,877
METHOD OF MAKING FUEL BODIES
Walter V. Goeddel, San Diego, and Massoud T. Simnad, La Jolla, Calif., assignors, by mesne assignments, to the United States of America as represented by the United States Atomic Energy Commission
No Drawing. Filed Dec. 31, 1958, Ser. No. 784,070
1 Claim. (Cl. 204—154.2)

The present invention is directed generally to an improved method of making fuel bodies for use in nuclear reactors. The invention is more specifically directed to the production of high density, mechanically strong fuel bodies which include a matrix of carbon or graphite which carries the carbide of a fissile material or the carbides of combinations of fissile and fertile materials.

In a reactor whose fuel elements are to be maintained at relatively high operating temperatures it is important that the fuel body be mechanically strong, have uniform energy producing and heat transmitting characteristics throughout the body, and be of desired density. The foregoing properties are important in order that the fuel body provides optimum conduction of heat without the development of isolated areas of elevated temperatures. Also, a fuel body of the proper density acts to inhibit the migration of unwanted fission products through and from the fuel body.

Heretofore, fuel bodies for use in reactors have been made by mixing the nuclear fuel with carbon or graphite together with pitch and binders, after which the material is cold pressed into the desired form. After the cold pressing, the formed body is baked at an elevated temperature in order to vaporize the volatile materials. In order to achieve optimum density and lack of porosity in the final product, the baking must be carried on at slow rate and over an extended period of time and often the baking period extends over a number of days or even over several weeks. Attempts have been made to speed up the baking procedure, however, when this is done, the rate of evolution of gas and volatiles is so great that the resulting fuel body becomes quite porous. Also, with the known methods of fabrication, the green density and green strength (before baking) are greater than after baking or firing. In other words, the baking reduces the density and strength and results in a weaker, more porous product.

These problems are particularly accentuated when the fuel element is to be operated at high temperatures since more stresses and strains are produced in the fuel body due to expansion and also at these temperatures, migration of unwanted fission products becomes more of a problem. Accordingly, it is extremely important when fabricating a fuel body or compact to be used in a high temperature reactor, that a strong, relatively non-porous body be obtained.

Accordingly, it is the principal object of this invention to provide a fuel body which is non-porous and mechanically strong. It is also an object of the invention to provide a method of making fuel bodies of the class described which can be accomplished at lower temperatures than those which have been heretofore employed, but which at the same time will provide a resulting fuel body which is stronger and more impervious to diffusible products than those made by the known methods. It is a further object of the invention to provide a method of making fuel bodies which may be carried out in a short period of time thereby obviating the long baking procedure which has heretofore been used. It is a specific object of the invention to provide an improved mechanically strong, substantially non-porous fuel body of uranium carbide or a mixture of uranium carbide and thorium carbide.

Other objects and advantages of the invention will become known from the following description of the invention.

Basically, the method of the invention involves first mixing the nuclear fuel material with the desired amount of carbon or graphite together with a suitable diffusional bonding material and the other materials which may be included in the fuel body. The mixture is then placed in a die of the proper shape and size to produce a fuel body of the desired dimensions and in which the mixture may be heated to temperatures which will effect a diffusional bonding of the particles. Pressure is then applied to the mixture and it is heated while maintaining it under pressures preferably over about 2,000 pounds per square inch. The pressure is maintained on the mixture until bonding is completed.

The diffusional bonding material serves to act as a sintering aid and results in a diffusional bonding of the particles at temperatures substantially below those required if the fuel material and the carbon or graphite were to be diffusionally bonded without their addition. Further, the addition of the diffusional bonding materials materially increases the mechanical strength and renders the fuel body less permeable to diffusible fission products. Also, by the use of these diffusional bonding materials, diffusional bonding will take place at temperatures as low as about 1500° C. as compared to temperatures of over about 2400° C. which are required if the bonding materials are not added.

Diffusional bonding materials which produce the desired results are the metals selected from the group consisting of zirconium, niobium (columbium), molybdenum, titanium, nickel, chromium, and silicon, and compounds of these metals which will be readily converted to the metal and thence to the carbide by heat in a reducing atmosphere.

It has been determined that the bonding is completed when employing the method of the invention, in a period of less than about one hour, often in a period of from 5 to 30 minutes, as compared to periods of as long as several weeks required for baking when the prior art methods are employed. Moreover, the fuel body made by this method is also more dimensionally accurate, is mechanically strong, and is otherwise more satisfactory than fuel bodies made by the prior art methods.

It has also been found that, if the mixture of fuel and carbon to be compacted is heated to the desired temperature in such a way that the entire body is heated substantially uniformly to the same temperature for susbtantially identical periods of time, the dimensional stability, and mechanical strength of the ultimate body are increased as is its imperviousness. It has been found that uniform heating may be accomplished by pressing the fuel mixture in a suitable die and passing high level electrical currents through the body for the desired period as it is being pressed. The current density and other current characteristics are chosen to produce and maintain the proper temperature for bonding over the heating and pressing period.

Also, it has been found that by correlating the size ranges of the carbon and carbides of the nuclear fuel, the proportion of the diffusional bond material and the temperatures and pressures employed in the pressing operation that a more impervious, mechanically stronger body may be produced.

As pointed out above, the method of this invention has particular applicability to the fabrication of fuel bodies from uranium and thorium carbides. Accordingly, the following specific examples will be directed to the production of uranium and thorium carbide fuel bodies, however, it will be apparent that the method of the in-

Example 1

Uranium and thorium carbides in the desired proportions for a fuel element are mixed together with a suitable amount of graphite or carbon and 4 percent by weight of zirconium hydride. The mixture is placed in a mold having the dimensions of the fuel element to be produced. Desirably, the carbides are prepared in the proper size range, which has been found to be between 100 and 500 microns for preferred results. The carbon is sized so that it will pass through a 200 mesh screen but will be held on a 325 mesh screen. The zirconium hydride is in particulate form and is sized to pass a 100 mesh screen.

Pressure of about 4,000 pounds per square inch is applied to the mixture in the die through a pressure plate, and the die and mixture are heated in a reducing atmosphere to a temperature of about 1600° C. The heating is continued for about 30 minutes at which time substantially all of the gas and volatiles are evolved from the fuel body and diffusional bonding has been accomplished. At that time the fuel body is slowly cooled and it will be found that the body is compact, has low porosity, and is mechanically strong.

Prior to use, the body can be reheated in a vacuum to remove any absorbed gases. The heating prior to use should be to a temperature well above the temperature to which the fuel body will be subjected during use in the reactor.

Example 2

The procedure of Example 1 is followed but the heating is accomplished by passing an electrical current through the material in the die. This is accomplished by connecting the pressure plate in the die to one terminal of a source of electrical current and connecting a conductor in the base of the die to the other terminal. An electrical current of a magnitude sufficient to produce the temperature of 1600° C. is applied, which temperature is maintained until substantially all gas and volatiles are evolved. The resulting fuel body is strong and relatively non-porous.

Example 3

A mixture of uranium and thorium carbides and carbon, as outlined in Example 1, is mixed with about 3 percent by weight finely divided metallic niobium. This mixture is pressed in the die and heated in a reducing atmosphere to about 1700° C., the pressure in the die being about 4,000 pounds per square inch. The heating is conducted for 15 minutes, after which time it is slowly cooled. A diffusional binding of the particles is effected and the resulting fuel body is strong and relatively non-porous.

Example 4

The process of Example 1 is carried out with 4 percent by weight of finely divided titanium oxide substituted for the zirconium hydride under the same conditions, with substantially the same results.

Example 5

The process of Example 3 was carried out with 3 percent by weight of finely divided silicon metal substituted for the zirconium hydride under the same conditions, with substantially the same results.

In a similar manner molybdenum, nickel, and chromium and their compounds may be employed to effect a diffusional bond. By employing the process of the present invention it is also possible to form the uranium and thorium carbides in situ from the oxides or silicides. This is of particular advantage when it is considered that uranium and thorium carbides are extremely difficult to handle. When the production of carbides in situ is desired, the following procedure may be employed.

Example 6

Uranium dioxide and thorium dioxide are mixed in the desired proportions with graphite powder and with any of the diffusion bonding materials set forth above, after which the material is heated and pressed as outlined in the foregoing. At temperatures in the range where diffusion bonding is effected, the oxides or uranium and thorium are converted to the carbides.

As has been pointed out above, the size range of the carbon employed in the fuel element is of importance in obtaining the desired properties of strength and relative non-porosity. Preferably, the carbon should be sized to pass through a 100 mesh screen and desirably it should be of such a size that it passes through a 200 mesh screen but are held on a 325 mesh screen.

The amount of diffusional bonding material employed may vary from about 1 to about 10 percent by weight and preferably from about 3 to 5 percent by weight and it is desirably sized to correspond to the same screen sizes as have been outlined above for the carbon.

As has been pointed out, the pressure should be over about 2,000 pounds per square inch, the upper limit being determined for all practical purposes by the physical strength of the equipment available. However, the preferred pressure is over 3,000 pounds per square inch. As to temperature, this, too, can vary over a wide range. The diffusional bonding takes place at temperatures of about 1500° C. or over, however, for optimum strengths and non-permeability it is desirable to maintain the heating in the range of from about 1500° C. to 1800° C.

The time of heating is, of course, that required to effect a volatilization of the volatile materials in the green fuel material and to effect diffusional bonding. When the method of the invention is employed the heating usually requires one hour or less and under most conditions the heating period need only require from 5 to 30 minutes.

Generally, it may be stated that similar results may be obtained at somewhat lower temperatures by raising the pressure under which the material is pressed so that by adjusting the amount of pressure it is possible to lower the temperature somewhat.

Also, in practicing the method of the invention, it is sometimes desirable to employ a preliminary cold pressing operation to aid in handling the green fuel body material. When this is done a small amount of readily volatizable binder such as tar or the like may be added to provide a low strength bond which will maintain the shape of the compact after a cold pressing operation. The cold pressed body may then be hot pressed in accordance with the invention to provide the ultimate bonding and densification.

Fuel bodies made in accordance with this invention have been found to be extremely dense and have a low diffusion constant. Further, by the use of the invention, dense, strong fuel bodies having especially good dimensional accuracy may be produced in short periods of time thereby avoiding the laborious and time consuming operations which were required by the prior art methods.

Various features of the invention are set forth in the appended claim.

We claim:

The method of making a fuel body for use in a nuclear reactor which comprises making a mixture for a fuel compact which includes a nuclear fuel material containing at least one component selected from the group consisting of uranium carbide, thorium carbide, uranium silicide, thorium silicides, uranium oxides and thorium oxides, finely divided carbon in a quantity sufficient to constitute a matrix in the final product, and a diffusional bonding material selected from the class consisting of zirconium, niobium, molybdenum, titanium, nickel, chromium, and silicon, heating said mixture to a temperature of from about 1500 to 1800° C. at which diffusional bonding will be effected while maintaining it under mechanical pressure of over about 3,000 pounds per square inch, the entire body of said mixture being heated to a substantially uniform temperature.

References Cited in the file of this patent

UNITED STATES PATENTS

| | | |
|---|---|---|
| 747,454 | Lowendahl | Dec. 22, 1903 |
| 849,643 | Spiers | Apr. 9, 1907 |
| 1,202,818 | Edgecomb | Oct. 31, 1916 |
| 1,959,879 | Schwarzkopf | May 22, 1934 |
| 2,051,972 | Tigerschiold et al. | Aug. 25, 1936 |
| 2,089,030 | Kratky | Aug. 3, 1939 |
| 2,791,025 | Ballhausen | May 7, 1957 |
| 2,814,857 | Duckworth | Dec. 3, 1957 |
| 2,906,596 | Ballhausen | Sept. 29, 1959 |
| 2,907,705 | Blainey | Oct. 6, 1959 |
| 2,910,416 | Daniels | Oct. 27, 1959 |
| 2,922,710 | Dombruwski | Jan. 26, 1960 |
| 2,971,839 | Nussbaum | Feb. 14, 1960 |

OTHER REFERENCES

TID–10001, Oct. 13, 1954.

ANL–5717, Mar. 31, 1957, pp. 10, 11, 12, and 33.

TID–7530 (Pt. 1) April 1957, pp. 3 and 115–140.

AEC Document TID–7546, bk. 2, Nov. 23, 1957, pp. 554–562.